United States Patent [19]

Kobayashi et al.

[11] Patent Number: 4,901,178
[45] Date of Patent: Feb. 13, 1990

[54] THIN FILM MAGNETIC HEAD

[75] Inventors: Tomio Kobayashi; Iwao Abe; Kazuo Kashiwa; Yukihiro Aizawa, all of Miyagi; Hiroyuki Suzukawa, Tokyo, all of Japan

[73] Assignee: Sony Corporation, Tokyo, Japan

[21] Appl. No.: 14,535

[22] Filed: Feb. 13, 1987

[30] Foreign Application Priority Data

| Feb. 13, 1986 | [JP] | Japan | 61-17961 |
| Apr. 26, 1986 | [JP] | Japan | 61-97656 |
| Apr. 26, 1986 | [JP] | Japan | 61-97657 |
| Sep. 4, 1986 | [JP] | Japan | 61-208701 |

[51] Int. Cl.$^4$ .............................................. G11B 5/147
[52] U.S. Cl. ..................................... 360/126; 29/603
[58] Field of Search .............. 360/121, 125, 126, 127, 360/119, 21; 29/603

[56] References Cited

U.S. PATENT DOCUMENTS

| 4,399,479 | 8/1983 | Meckel | 360/126 |
| 4,577,250 | 3/1986 | Sato et al. | 360/121 |
| 4,601,099 | 7/1986 | Nishiyama | 360/126 |

OTHER PUBLICATIONS

Peterson, "Thin Film Magnetic Heads," IBM TDB, vol. 21, No. 12, May 1979, p. 5002.

Primary Examiner—John H. Wolff
Assistant Examiner—Matthew J. Bussan
Attorney, Agent, or Firm—Hill, Van Santen, Steadman & Simpson

[57] ABSTRACT

A thin film magnetic head whereby the inclined surface is formed with a prescribed angle relative to the upper surface of the substrate in the vicinity of a slide contact surface thereof with a magnetic recording medium, the magnetic gap is formed on the magnetic film on the inclined surface, and the azimuth of the magnetic gap is set by the inclined surface.

By forming grooves or protrusions on the substrate, the inclined surface by which the azimuth of the magnetic gap is set is defined. A coil conductor is formed on the flat portion of the upper surface of the substrate.

With the thin film magnetic head presented by this invention, a double azimuth thin film magnetic head of a multi-channel thin film magnetic head can be easily provided.

17 Claims, 20 Drawing Sheets 4,901,178

THIN FILM MAGNETIC HEAD

BACKGROUND OF THE INVENTION

1. Field of the Invention

This invention relates to a magnetic inductive type thin film magnetic head and more particularly to a thin film magnetic head suitable for use with the so-called azimuth recording system.

2. Description of the Prior Art

In general, a thin film magnetic head has been known as a device for recording information signals with a high density on a magnetic recording medium such as a magnetic tape or a magnetic disk.

The thin film magnetic head is practically used as the magnetic head suitable for high speed high density recording for the following reasons. First, it is high in effective magnetic permeability in the range of higher frequencies through the use of a thin ferromagnetic metal film, such as Fe-Al-Si alloy film, as the magnetic core material, while it has a high saturation magnetic flux density and therefore it is excellent in a recording and reproducing efficiency. In addition, it can be controlled easily as to the gap length so that a narrow gap may be produced. It has a reduced thickness in the vicinity of the magnetic gap so that a recording magnetic field of a steep gradient may be produced. Since a large number of head elements are formed in a lump on the wafer, a large number of magnetic heads can be mass-produced.

Recently, what is called the azimuth recording system in which the guard bands between the recording tracks are removed for further improving the recording density has been evolved. In this system, the magnetic gap of the magnetic head is arranged obliquely to the widthwise direction of the recording track. What is called the azimuth loss is ingeniously employed in order to prevent the occurrence of the cross-talk phenomenon caused by signal reproduction from the adjacent tracks.

So far, the thin film magnetic head suitable for azimuth recording, that is, the magnetic gap of which is inclined relative to the running direction of the magnetic medium, was prepared by the following method. First, the lower magnetic film is formed on the base or substrate and the coil conductor is wound through an insulating film on the lower magnetic film. The upper magnetic film is formed through the intermediary of a gap spacer or an insulating film to form a magnetic gap. Since the magnetic gap is formed at this stage in parallel with the substrate acting as the reference surface, the heads are produced by slicing the wafer obliquely to the reference surface to afford an azimuth to the magnetic gap.

However, when the heads are produced by slicing the wafer obliquely as described above, the sliced surface needs to be precisely ground in order to assure an azimuth accuracy of the magnetic gap. Hence, the production process of the thin film magnetic head becomes more complex while the satisfactory azimuth accuracy is not always achieved.

Recently, in pursuit for a high picture quality recording in the field of VTRs, there has been evolved what is called a digital VTR in which the video signals are recorded by the pulse code modulation (PCM) system. Since the volume of signals to be recorded is drastically increased in the digital VTR as compared to the conventional or analog VTR, plural tracks need to be recorded simultaneously (multichannel recording system). Hence a demand has been raised for evolving a multi-channel thin film magnetic head having an azimuth in the magnetic gap.

However, in the above described conventional method of producing the multi-channel thin film magnetic head, the azimuth is obtained only at the time of slicing the head block into head pieces, so that it is not possible to produce the multi-channel thin film magnetic heads having the in-line azimuth gaps.

Hence it was necessary in the prior art to have the head chips secured accurately to the head drum after the proper azimuth was set relative to the tape running direction. However, this operation usually required a great deal of skill and, above all, a considerable painstaking operation was required in the adjustment of the gap interval or the setting of the track height. As a result, the efficiency of the assembling operation is markedly lowered, while problems are also involved in the Yield and production costs.

SUMMARY OF THE INVENTION

It is an object of the present invention to provide a thin film magnetic head that is superior in azimuth accuracy It is another object of the present invention to more efficiently provide a double azimuth thin film magnetic head superior in azimuth accuracy.

It is yet another object of the present invention to more accurately and efficiently provide a multichannel thin film magnetic head with an in-line pattern of azimuth gaps According to the present invention, an inclined surface with a prescribed angle relative to the upper surface of the substrate is formed by an inclined grooves or protrusions in that portion of the substrate that is adjacent to the sliding contact surface of the substrate with the magnetic medium such that the azimuth of the magnetic gap is set by the inclined surface. The result is that the azimuth is inclined from the outset by the prescribed angle relative to the upper surface of the substrate acting as the reference surface. Hence, the azimuth gap is formed by slicing the substrate normal to the slide contact surface for producing the cut head pieces. Hence, the grinding step of the slicing surface may be dispensed with, the production process simplified and the azimuth accuracy improved considerably.

In the present specification the term in-line disposition or in-line pattern of the azimuth gaps means that the azimuth gaps when seen towards the slide contact surface of the head block or substrate are inclined in the same direction or symmetrically relative to a vertical line, are of the same length and comprised within a zone extending parallel to the upper or lower straight edges of the slide contact surface.

BRIEF DESCRIPTION OF THE DRAWINGS

FIG. 1 is a perspective view of a forming process of the inclined grooves.

FIG. 2 is a perspective view of a forming process of the coil conductor and outgoing conductor.

FIG. 3 is a perspective view of a forming process of the resin layer.

FIG. 4 is a perspective view of a forming process of the upper magnetic film.

FIG. 5 is a plan view of a bonding process of the protective plate and a slicing process.

FIG. 12 is a perspective view of a forming process of the inclined grooves and grooves for electrodes.

FIG. 13 is a perspective view of a forming process of the magnetic circuit section. FIG. 14 is a perspective view of a bonding process of the protective plate.

FIG. 16 is a perspective view showing a forming process of the lower magnetic film. FIG. 17 is a plan view of a multi-channel thin film magnetic head obtained when the composite substrate shown in FIG. 16 is used.

FIG. 18 is a plan view showing a forming process of a lower magnetic film. FIG. 19 is a plan view of a multichannel thin film magnetic head obtained when the composite substrate shown in FIG. 18 is used.

FIG. 21 is a perspective view of a forming process of the protrusions.

FIG. 22 is a perspective view of a forming process of the magnetic circuit section.

FIG. 23 is a plan view of a bonding process of the protective plate and a slicing process.

FIG. 28 is a perspective view of a forming process of the lower magnetic film.

FIG. 29 is a plan view of a multi-channel thin film magnetic head obtained when the composite substrate shown in FIG. 28 is used.

FIG. 33 is a perspective view showing a thin film magnetic head.

FIG. 34 is a partial sectional view taken on line b—b in FIG. 33.

FIG. 35 is a plan view showing a forming process of the protrusion.

FIGS. 36 to 38 show manufacturing methods of the thin film magnetic head relates to the present invention according to the actual process flow.

FIG. 37 is a plan view showing a forming process of the magnetic circuit section.

DESCRIPTION OF PREFERRED EMBODIMENTS

Figure 1:
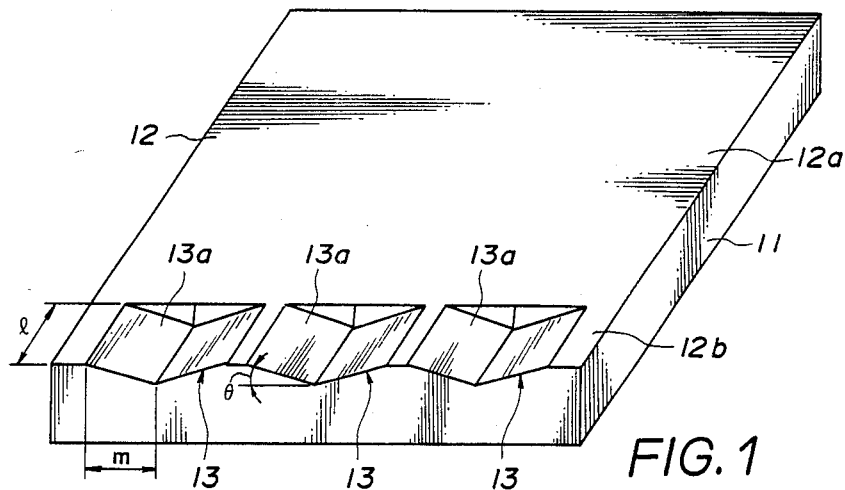
FIGS. 1 to 5 show manufacturing processes of the thin film magnetic head in one embodiment of the present invention according to the actual sequence.

Reference is now had to the accompanying drawings illustrating certain preferred embodiments of the present invention.

A method for producing the thin film magnetic head of the present invention will first be explained for clarifying its structural features. It is noted that, although the insulating films between the substrate, coil conductors, and upper magnetic film or the like are not shown in the drawings, the film or conductors are actually insulated from one another.

To produce the thin film magnetic head of the present invention, as shown in FIG. 1, plural inclined grooves 13 are formed by grinding or ion etching in a zone 12b on an upper surface 12 of a flattened magnetic substrate or base 11 adjacent to an edge surface facing to a magnetic recording medium, not shown in FIG. 1, to form a plurality of inclined surfaces 13a with a predetermined azimuth angle θ. Each of these inclined surfaces 13a defines a surface providing a magnetic gap forming surface.

The inclined surface 13a is designed so that a width 1 thereof in the direction of the edge surface is at least larger than the depth of the magnetic gap and a width m of the inclined surface 13a is equal to or slightly larger than the predetermined track width.

In the present embodiment, the magnetic substrate 11 is made of a ferromagnetic oxide material such as Mn-Zn ferrite or Ni-Zn ferrite. This substrate 11 forms one of the magnetic cores.

Figure 2:
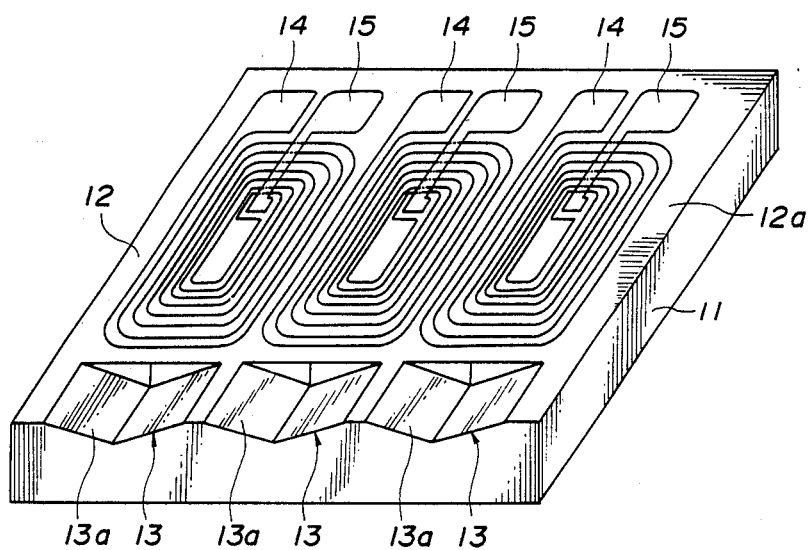

Then, as shown in FIG. 2, an insulating film, not shown, made of $SiO_2$, for example, is formed on the overall upper surface 12 inclusive of the inclined surface 13a, and then an electroconductive metal material such as Cu or Al is applied to a flat portion 12a of the upper surface 12 by vacuum thin film forming techniques, such as sputtering. Then, a coil conductor 14 is formed by pattern etching to a predetermined shape. Then an insulating film, not shown, is formed for covering the coil conductor 14 and an outgoing electrode 15 is formed which is electrically connected to the coil conductor 14 through a contact window formed in the insulating film. Thus, in the present embodiment, the coil conductor 14 is in a spiral 3-turn wound structure. It will be noted that the wound structure of the coil conductor 14 is not limited to the spiral type but may be of any other type such as multi-layered helical or zig-zag type.

In the present embodiment, since the coil conductor 14 is formed on the flat portion 12a other than the inclined surfaces 13a that will form the magnetic gap forming surface, an etching resist can be evenly coated at the time of this patterning, so that patterning accuracy of the coil conductor 14 can be insured even though the inclined grooves 13 are formed in the magnetic substrate 11.

Figure 3:
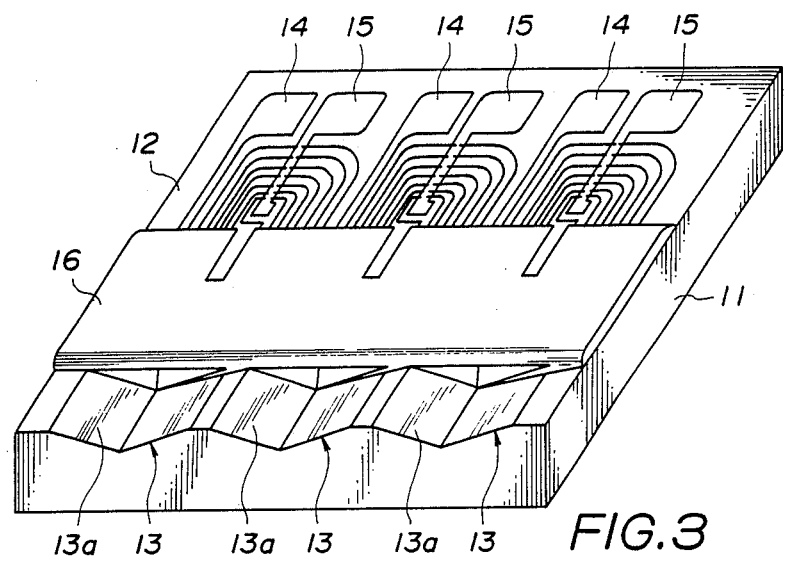

Then, as shown in FIG. 3, for smoothing out the irregularities due to the coil conductor 14 and the outgoing electrode 15 and also for providing for electrical insulation from an upper magnetic film to be described later, a resin layer 16 is formed on the coil conductor 14. The resin layer 16 is formed by coating a heat-resistant resin or a heat-resistant resist, which is follow by removal of the resin from the front gap and back gap portions. It is to be noted that, instead of forming the resin layer 16, an insulating film such as $SiO_2$ film may be coated as by sputtering.

The heat-resistant resin may include polyimide resins. For example, those resins that are superior in heat resistance, such as the resin manufactured by Hitachi Kasei Kogyo KK under the trade name of PIQ, the resin manufactured by Du Pont under the trade name of Pyralin, or the SP series manufactured by Toray KK, may be employed. As the heat-resistant resist, the negative type rubber resist may be employed, such as OMR-83 series manufactured by the Tokyo Oka KK or the JSR series manufactured by the Nippon Gosei Gum KK.

The insulating film formed on the inclined surface 13a is then removed by ion etching and a gap film of $SiO_2$ or $Ta_2O_5$, not shown, is formed on the inclined surface 13a to a predetermined gap length.

Figure 4:
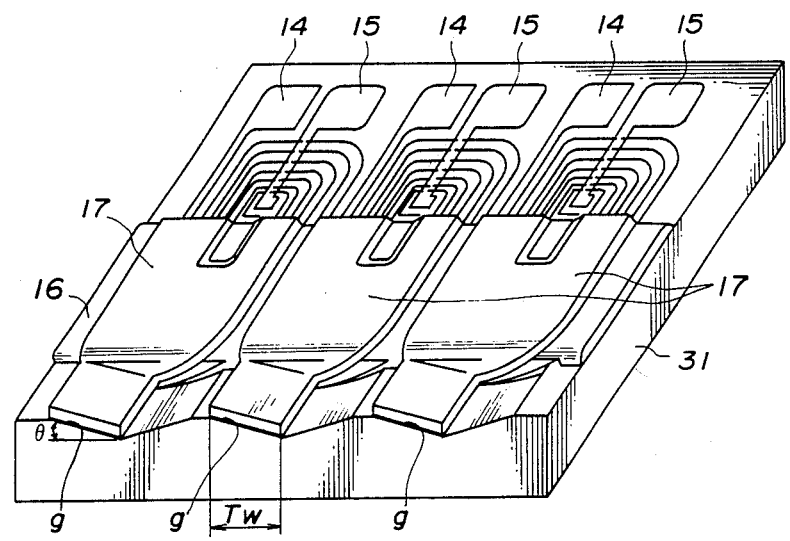

Then, as shown in FIG. 4, a ferromagnetic metal material is coated on the resin layer 16 and on the inclined surfaces 13a. The upper magnetic film 17 is then formed by etching to a predetermined track width Tw. In such manner, an azimuth gap g whose track width Tw is set by the upper magnetic film 17 is formed.

The azimuth gap g is inclined by an angle θ relative to the upper surface 12 of the magnetic substrate 11 acting, as the reference surface.

Since the height difference of the coil conductor 14 applied below the upper magnetic film 17 is reduced or smoothed by the resin layer 16, the magnetic layer 17 becomes approximately flat so that the film properties and, above all, the magnetic properties of the upper magnetic film are improved.

The materials for the upper magnetic film 17 may include ferromagnetic non-crystal metal alloys or so-called amorphous alloys, Fe-Al-Si, Fe-Ni, Fe-Al, Fe-Si-Co or Fe-Ga-Si alloys. These materials may be deposited by vacuum thin film forming techniques, such as flash evaporation, ion plating, sputtering or cluster ion beam method. The upper magnetic film 17 is not limited to the single layer film as described herein but may also be formed by alternate laminations of the high wear resistant insulating film such as $SiO_2$, $Ta_2O_5$, $Al_2O_3$, $ZrO_2$ or $Si_3N_4$ and the thin film of the above enumerated magnetic metal materials. In such case, the number cf laminations of the thin films of the magnetic metal may optionally be selected. The upper magnetic film 17 constitutes the other magnetic core.

Figure 5:
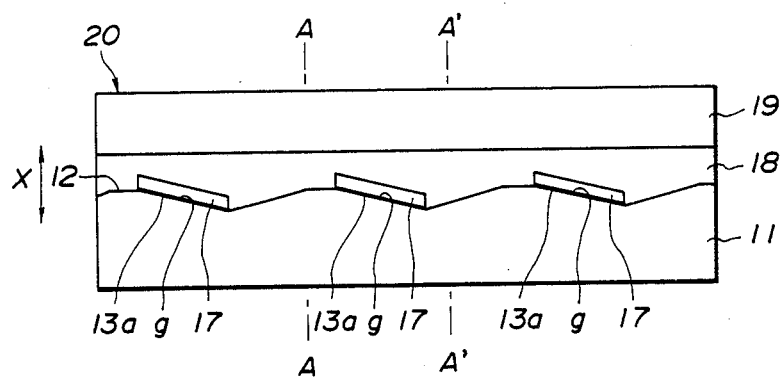

Then, as shown in FIG. 5, for protecting the magnetic circuit formed with the coil conductor 14 and the upper magnetic film 17 and for assuring a sliding contact against the magnetic recording medium, glass, or similar nonmagnetic material 18 is filled in the molten state on the magnetic film 17. Then a protective plate 19 is melt-bonded to the flat upper surface of the non-magnetic material 18 to produce a head block 20.

Figure 6:
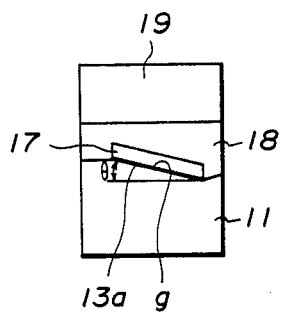
FIG. 6 is a plan view of a thin film magnetic head manufactured by the above processes shown in FIGS. 1 to 5.

The head block shown in FIG. 5 is sliced in a direction normal to the reference surface or the upper surface 12 along lines A—A and A'—A'. Then, the edge surface contacted by the magnetic medium is ground to a cylinder to complete the single-track thin film magnetic head shown in FIG. 6.

The thin film magnetic head obtained in this manner has its magnetic gap inclined at a predetermined angle θ with respect to the reference surface or the upper surface 12.

In the present embodiment, since the azimuth of the magnetic gap is set by the inclined surface 13a previously formed on the upper surface 12 of the magnetic substrate 11 inclined at the predetermined angle, the produced thin film magnetic head is superior in azimuthal accuracy Heretofore, the magnetic gap is endowed with an azimuth angle by slicing the substrate obliquely to the upper surface 12 and by grinding the sliced surface to assure the desired azimuthal accuracy. However, despite the painstaking grinding operation, it has been difficult to obtain the desired azimuthal accuracy. According to the present embodiment, the magnetic gap azimuth can be set easily and accurately.

When the slicing interval is set so as to be larger at the time of slicing shown in FIG. 5, so that plural magnetic gaps are arranged in a single head chip, a multi-channel thin-film magnetic head with plural azimuth gaps g arranged in an in-line pattern is obtained. Although a three-channel thin film magnetic head is shown in FIG.

5, the present invention is not limited to this specific number of channels.

In such manner, the thin film magnetic head having a sole azimuth gap g or a multi-channel thin film magnetic head having a plurality of azimuth gaps g arranged in the in-line pattern may be obtained easily and with high accuracy The above described multi-channel thin film magnetic head has a further advantage that it can be mounted on the drum with high accuracy without the necessity of track positioning setting. In addition, no deviation in timing is caused at the time of reproduction among the respective channels, so that the head drive circuit can be reduced in size.

Figure 7:
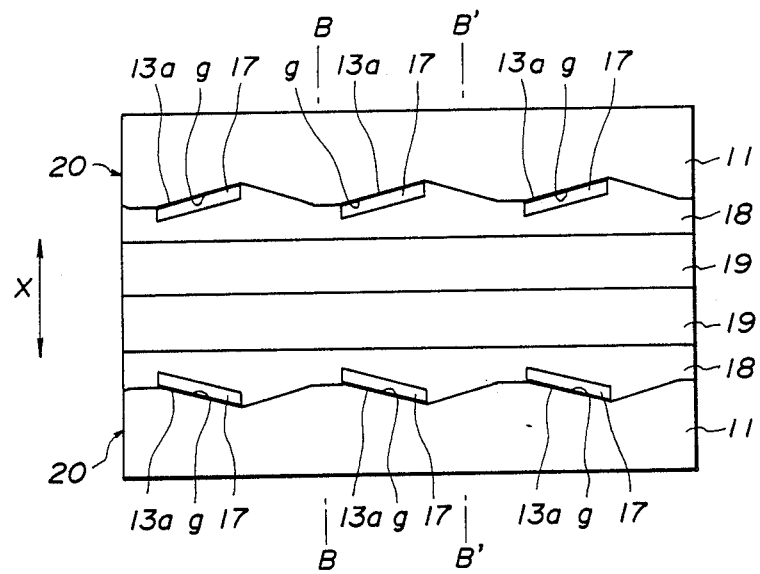
FIG. 7 is a plan view of pairs of head blocks, shown in FIG. 5, mutually bonded so that two series of azimuth gaps are opposed each other as viewed from the running direction of magnetic recording media.
Figures 8A, 8B:
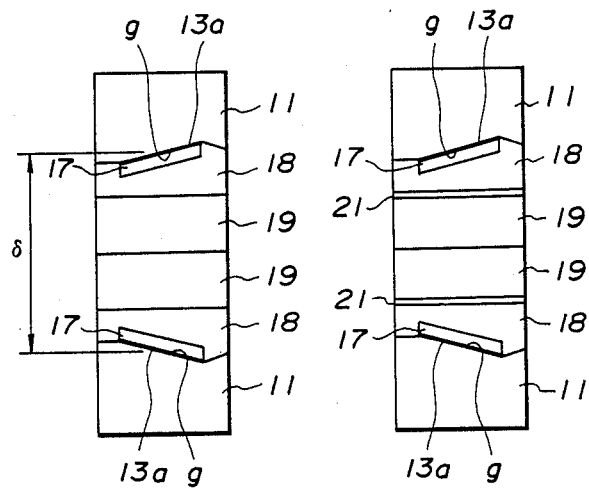
FIG. 8A is a plan view showing a double-azimuth thin film magnetic head which is obtained by slicing the head block shown in FIG. 7.
FIG. 8B is a plan view showing a double-azimuth thin film magnetic head inserted with shield layers.

Also, as shown in FIG. 7, when a pair of head blocks 20 are united to each other so that the respective magnetic gaps g face to one another and, sliced along lines B—B and B'—B' in FIG. 7, a so-called double-azimuth thin-film magnetic head shown in FIG. 8A is produced.

Since the azimuth gaps g are oriented in the same azimuth direction in the head block 20 prior to the slicing step, a double-azimuth thin film magnetic head can be obtained easily and with high accuracy by slicing the head blocks 20 in a normal direction to the abutting reference surfaces.

The above described double azimuth thin film magnetic head is suited to a field still reproduction, that is, the reproduction by repeated scanning of the same recording track. In such case, azimuthal accuracy may be improved through application of the present invention. Also, the gap interval δ may be made narrower than in the case of the double azimuth magnetic heads consisting of the so-called bulk type heads bonded to each other, so that the sliding contact with the magnetic recording medium is significantly improved. In addition, since the complicated process of mounting the single azimuth heads separately on the rotary drum is dispensed with, the operational reliability and production efficiency are also improved.

Figure 9:
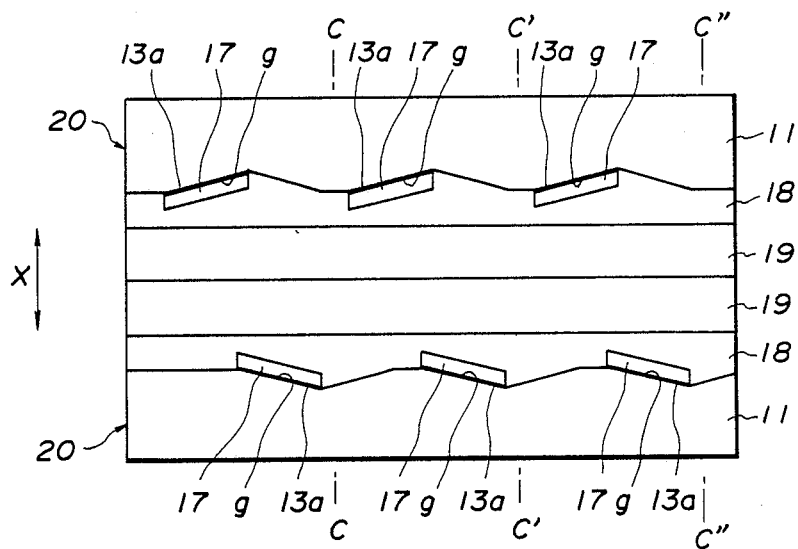
FIG. 9 is a plan view of pairs of head blocks, shown in FIG. 5, mutually bonded so that individual ends of opposed azimuth gaps are slightly overlapped as viewed from the running direction of magnetic recording media.
Figures 10A, 10B:
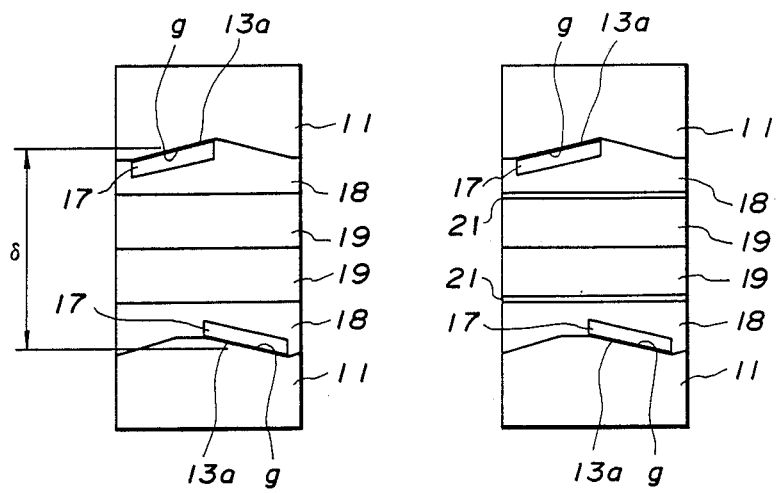
FIG. 10A is a plan view showing a multi-channel thin film magnetic head manufactured by slicing the head block shown in FIG. 9.
FIG. 10B is a plan view showing a multi-channel thin film magnetic head inserted with shielding layers.

Referring to FIG. 9, a pair of head blocks 20 are abutted and united to each other so that the azimuth gaps g of the head blocks 20 are slightly overlapped with each other when seen in the running direction X of the magnetic recording medium and the head blocks thus bonded to each other are then sliced along lines C—C and C-C' shown in this figure to produce a multi-channel thin film magnetic head shown in FIG. 10A. This multi-channel thin film magnetic head can be used for simultaneously actualizing a high-density recording of plural channels, herein two channels, so that it may advantageously be used for digital VTR applications.

Therefore, by the application of the present invention, the adjustment operation of the gap interval δ or track height setting may be dispensed with. A broader machining tolerance may be used for mounting the head to the rotary drum. As a result, the reliability of the thin film magnetic head, azimuth accuracy, production efficiency and yield and the properties in the sliding contact with the tape are significantly improved, with a narrower gap interval also achieved.

At the time of the slicing operation shown in FIGS. 7 and 9, the slicing interval can be set to a larger value such that a multi-channel thin film magnetic head is obtained in which plural azimuth gaps g are arranged in a side-by-side relation in one head chip. FIGS. 7 and 9 illustrate 3-channel and 6-channel double-azimuth thin film magnetic heads, respectively.

Figure 11A:
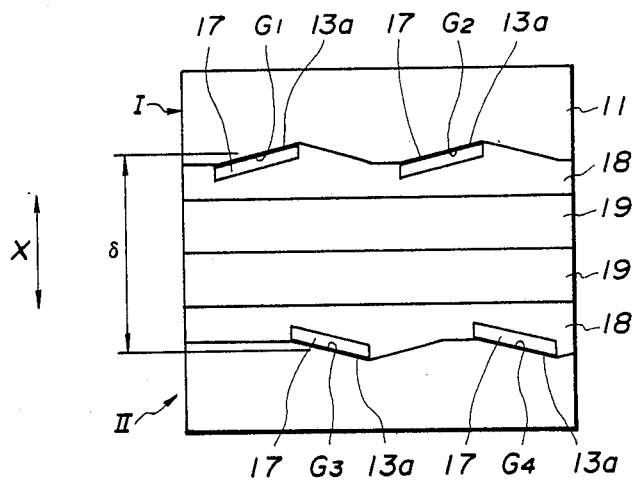
FIG. 11A is a plan view of a four-channel thin film magnetic head.

FIG. 11A shows a 4-channel double azimuth thin film magnetic head obtained by slicing the substrate along lines C—C and C"—C" in FIG. 9. This thin film magnetic head has thin film head sections I and II in which two azimuth gaps $G_1$ and $G_2$ as well as $G_3$ and $G_4$ are formed in the in-line relation such that these azimuth gap $G_1$, $G_2$, $G_3$, $G_4$ are slightly overlapped when seen in the travelling direction X of the magnetic recording medium.

When the azimuth gap g is formed in a confronting relation to each other as shown in FIGS. 8A, 10A and 11A, the sliding contact properties with the magnetic recording medium are improved since the gap interval δ becomes narrower. However, so-called crosstalk tends to be produced between the opposing gaps g so that satisfactory electromagnetic conversion characteristics are not obtained.

Figure 11B:
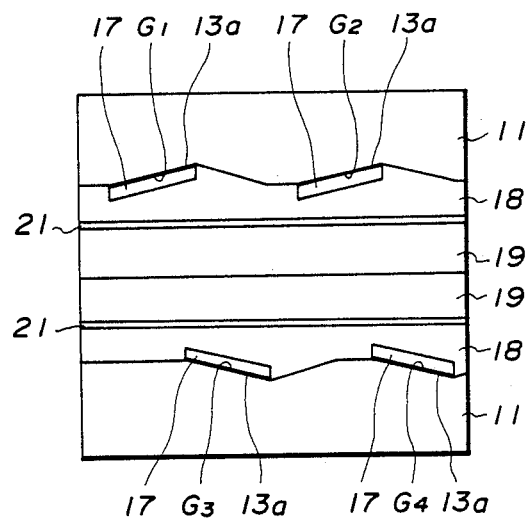
FIG. 11B is a plan view of a four-channel thin film magnetic head inserted with shielding layers.

In order to eliminate such crosstalk, a shield layer 21 may be interposed between the azimuth gaps g as shown in FIGS. 8B, 10B and 11B.

The shield layer 21 thus provided between the azimuth gaps g acts as a barrier against leakage fluxes responsible for crosstalk so that satisfactory electromagnetic conversion characteristics are obtained.

The shield 21 may be prepared with high permeability materials such as Ni-Fe alloys (Permalloy) using vacuum thin film forming techniques, such as sputtering.

The thickness of the shield layer 21 need be set to a proper value in consideration of the operating conditions of the magnetic heads since too large a thickness results in the larger gap interval δ and non-uniform abutment of the magnetic recording medium while too small a thickness results in only an insufficient shielding effect. The shield layer 21 may simply be interposed between the azimuth gaps g or grounded through suitable terminals. Although two shield layers 21 are provided in the present embodiment, any desired number of shield layers may be used, if they are interposed between the opposing azimuth gaps g. In the case of the multi-channel thin film magnetic head shown in FIG. 11B, shield layers 21 each designed for 2-micron thickness are interposed between the azimuth gaps g.

As the gap interval δ becomes narrower, the electrodes of the two thin film heads adapted for connection with external terminals such as flexible printed circuit boards are formed in proximity to each other, so that it becomes difficult to make such connection. In such case, it suffices that these electrodes be formed at the rear end of the heads, or on the reverse side of the slide contact surface with the magnetic recording medium. In the following, the description will be made with reference to FIGS. 12 to 14, wherein the parts or components same as those shown in FIGS. 1 to 11 are indicated by the same reference numerals, and the corresponding description is omitted for simplicity.

Figure 12:
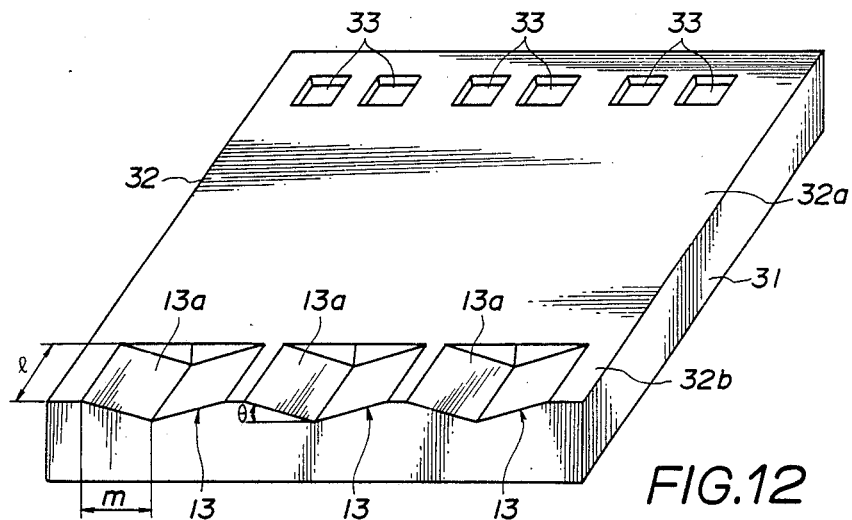
FIGS. 12 to 14 show the manufacturing processes in another embodiment of the present invention according to the actual sequence.

Referring to FIG. 12, a plurality of inclined grooves 13 are formed in a portion 32b of a magnetic substrate 31 that is adjacent to the sliding contact surface thereof with the magnetic recording medium so that inclined surfaces 13a corresponding to the magnetic gap forming surfaces and being inclined at a predetermined azimuth angle θ are formed. Similarly, a plurality of slots 33 for electrodes are also formed in a portion of the outgoing conductors 15 and coil conductors 14 that are to be formed in the subsequent steps.

Figure 13A:
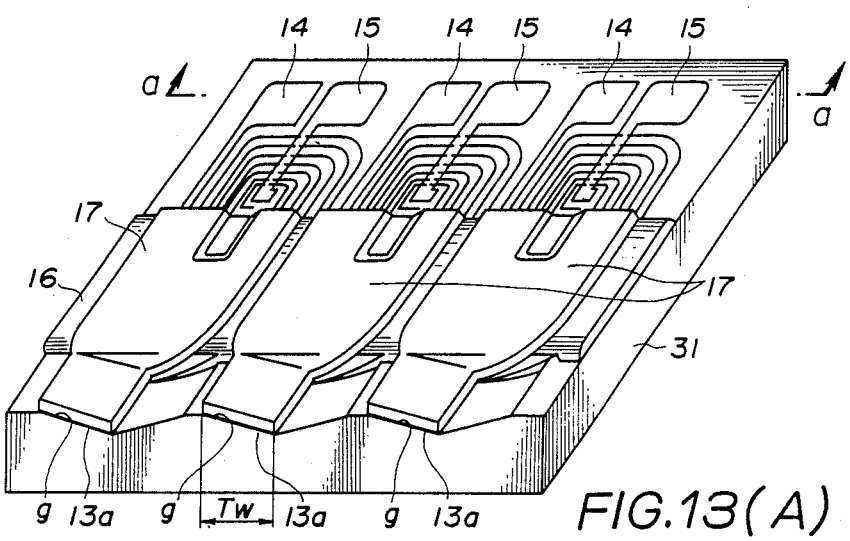
FIG. 13B is a sectional view of the magnetic circuit section taken on line a—a of FIG. 13A.
Figure 13B:
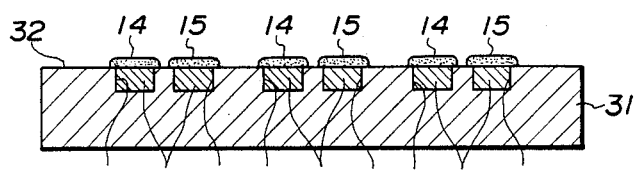

Then, as shown in FIGS. 13A and 13B, electroconductive metal is filled in these slots 33 so as to be used as electrodes 34. Then, an insulating film, not shown, is formed on the overall surface 32 excluding these electrodes 34, and the coil conductors 14, as well as the outgoing electrodes 15 are formed in the same manner as described in the preceding embodiment. As a result, these coil conductors 14 and the outgoing electrodes 15 are electrically connected with the electrodes 34.

The resin layer 16 and the upper magnetic film 17 are then formed in the same manner as described in the connection by the preceding embodiment.

Figure 14:
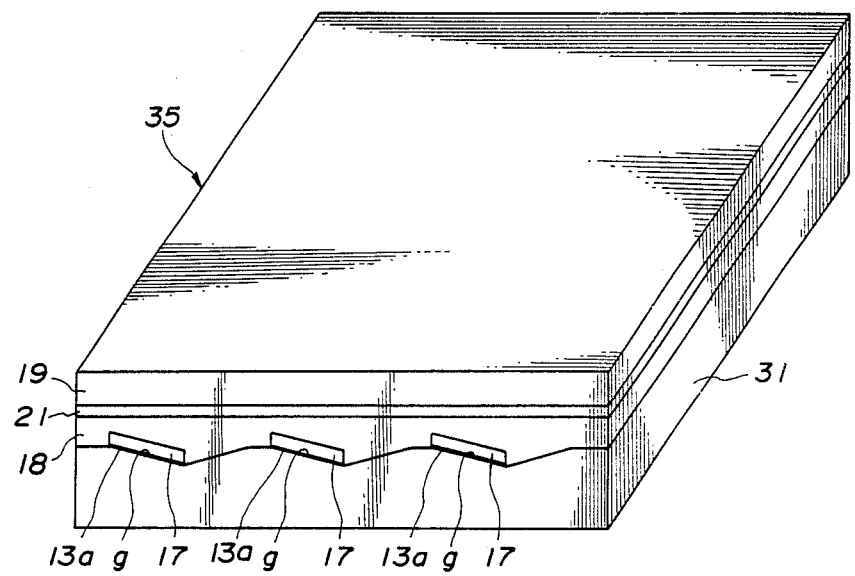

Then, as shown in FIG. 14, a non-magnetic material 18 such as glass is melt-charged on the overall surface of the magnetic substrate 31 to protect the magnetic circuit constituted by the magnetic substrate 31, the coil conductor 14 and the upper magnetic film 17 and, if required, the shield layer 21 formed with a high permeability material is deposited on the material 18. A protective layer 19 is then formed to complete the head block 35.

Figure 15:
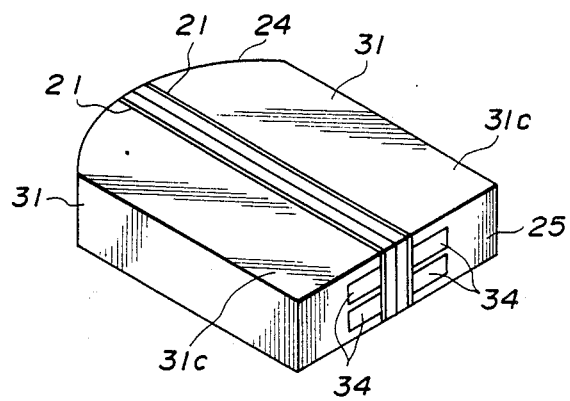
FIG. 15 is a perspective view showing the rear side of the thin film magnetic head manufactured through the processes shown in FIGS. 12 to 14.

Then, a pair of the so-produced head blocks 35 are abutted and bonded to each other through track positioning and the blocks thus bonded together are sliced at predetermined slicing positions similarly to the preceding embodiments. They are simultaneously sliced at the corresponded slicing position where the electrodes 34 are formed, that is, along the line a—a in FIG. 13 to expose these electrodes. In such manner, the thin film magnetic head shown in FIG. 15 is obtained.

In this thin film magnetic head, the electrodes 34 electrically connected with the coil conductors 14 and the outgoing conductors 15 are formed on a section of a back surface 25 opposite to a sliding contact surface 24 of the magnetic recording medium, so that a highly reliable electrical connection with an external terminal may be obtained despite the narrow gap interval $\delta$. In addition, since the protective plate 19 may be provided to the magnetic head in its entirety, the mechanical strength of the magnetic head is also improved. It is to be noted that the same result may be obtained when the electrode 34 is formed on a side 31c of the substrate 31.

In the preceding embodiments, the magnetic substrate is formed with a ferromagnetic oxide material such as Mn-Zn ferrite. However, the present invention is not limited to these embodiments, but may also be applied to the case of using a composite substrate composed of the aforementioned magnetic metal material that is laminated on the non-magnetic substrate such as ceramics, or a composite substrate composed of the ferromagnetic metal material that is laminated on the aforementioned ferromagnetic oxide substrate.

Figure 16:
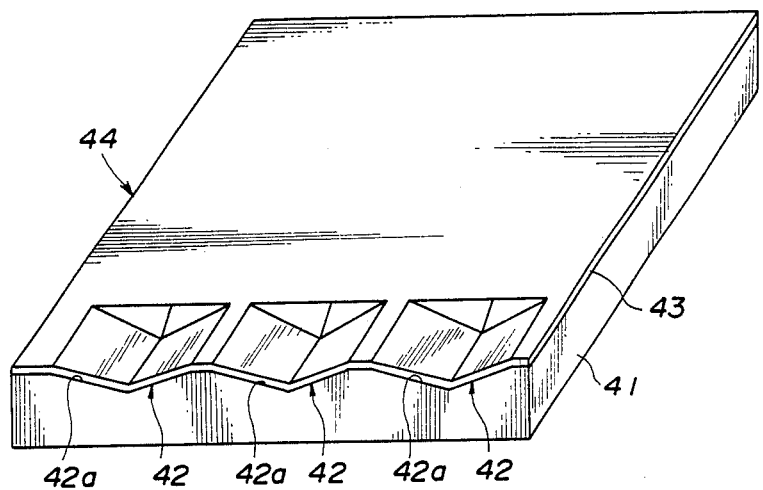
FIGS. 16 and 17 show another embodiment of the present invention.

When using these composite substrates, as shown in FIG. 16, a plurality of grooves 42 are previously formed on the non-magnetic or magnetic oxide substrate 41 for forming inclined surfaces 42a having the azimuth as described above. The ferromagnetic metal material is then deposited on the overall surface of the substrate 41 including the inclined surface 42 a to form the lower magnetic film 43. When a non-magnetic substrate is used as the substrate 41, the lower magnetic film 43 forms the one magnetic core, and when a magnetic oxide substrate is used, the substrate and the lower magnetic film 43 form the one magnetic core.

Figure 17:
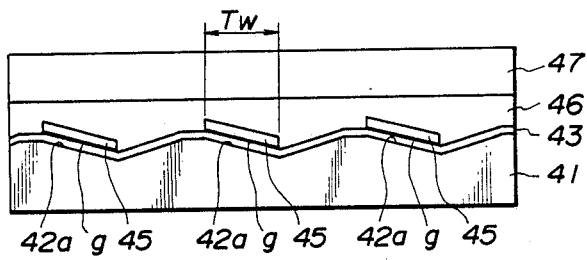

Then, as shown in FIG. 17, the coil conductors, not shown, and upper magnetic film 45 are formed on the film 43 via an insulating-film, not shown, by using micro machining techniques, such as photolithography, as in the preceding embodiment, thereby a protective plate 47 is bonded to substrate 41 using a non-magnetic material 46 so as to cover these coil conductors and the film 43. In such manner, the head block is obtained, in which a plurality of azimuth gaps g are formed in the in-line pattern and the track width Tw of the azimuth gap g is set by the lower magnetic film 43 and the upper magnetic film 45 on the inclined surface 42a.

By using the ferromagnetic metal material, which is the high saturation magnetic flux density alloy, as the magnetic core material, there is provided a thin film magnetic head advantageously employed for the recording and reproduction of the high coercive force magnetic recording medium that is suited to high density recording.

Figure 18:
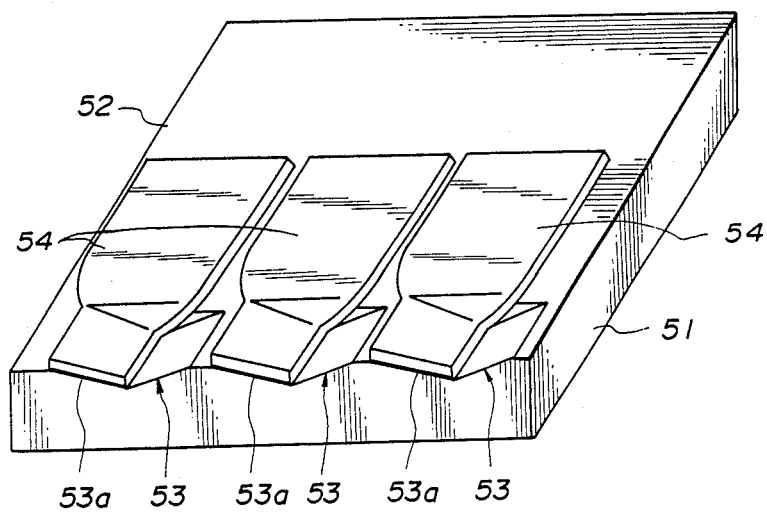
FIGS. 18 and 19 show another embodiment of the present invention.

Alternatively, as shown in FIG. 18, a ferromagnetic metal material is deposited as by sputtering on a nonmagnetic substrate or a magnetic oxide substrate 51 having surfaces 53a inclined at a predetermined azimuth on the upper surface 52 of the substrate 51. Then, the lower magnetic films 54 separated for the respective channels are formed by patterning so that the magnetic metal material is left only on the portions forming the magnetic path.

Figure 19:
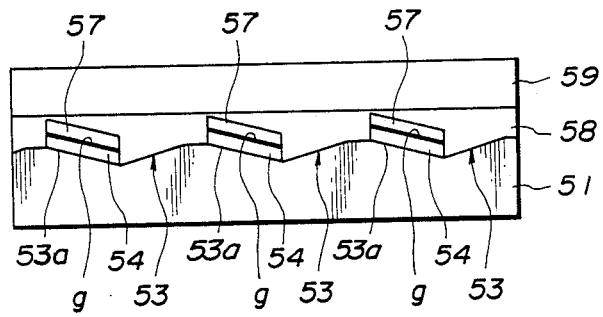

Then, by using the same techniques as described in connection with preceding embodiments, the coil conductors, not shown, and the upper magnetic film 57 are formed on the film 54 via an insulating film, not shown, as shown in FIG. 19, and the protective plate 57 is melt bonded to the substrate 51 with a non-magnetic material 58 so as to cover the coil conductor to form the head block having the azimuth gaps g arranged in the in-line pattern.

The obtained thin film magnetic head has such a construction in which the magnetic gaps g are separated from one another channelwise, so that, when the head is used as the multi-channel thin film magnetic head, the crosstalk from the adjacent and next adjacent tracks is significantly lowered, thus resulting in the excellent recording and reproducing characteristics of the magnetic head.

The inclined grooves 42 or 53 may be formed on the nonmagnetic substrate 41 or 51 not only by the method of using a grinding wheel for processing or ion etching, but also by the method consisting of forming a metal mold for the substrate 41 or 51 from a metal cr nonmetal having good workability, such as Cu-Zn alloy or aluminium, forming a plastic sub-mold using this metal mold and producing the substrate 41 or 51 having the inclined grooves 42 or 53 by electro-forming. By forming the substrates with the inclined grooves using the metal mold, it is possible to produce the thin film magnetic head with the azimuth gaps g with significantly lowered production costs.

Figure 20:
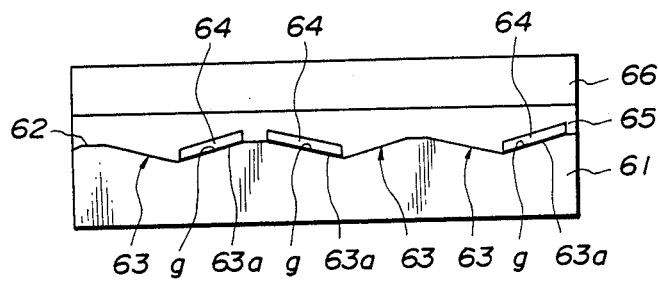
FIG. 20, which relates to another embodiment of the present invention, is a plan view showing a multi-channel thin film magnetic head in which azimuth gaps inclined at counter directions are alternately aligned.

Referring now to FIG. 20, a multichannel thin film magnetic head having azimuth gaps g in an alternate in-line pattern is shown. In producing this magnetic head, a plurality of inclined grooves 63 presenting inclined surfaces 63a alternately inclined in the opposite direction at a prescribed azimuth angle are formed on a reference surface, that is, the upper surface 62 of the magnetic substrate 61. The coil conductors, not shown, and the upper magnetic film 64 are formed on the substrate in register with these inclined surfaces 63a and the protective plate 66 is meltbonded to the substrate 61 via a non-magnetic layer 65 so as to cover the film 64 to complete the magnetic head. It is to be noted that the composite substrates as described above can be used herein, while the head of the present embodiment can also be applied to the double azimuth thin film magnetic heads in which two head blocks with the in-line azimuth gaps are bonded together in an opposed manner.

In the above described embodiments of the thin film magnetic heads, the azimuth angle of the magnetic gap is formed by the inclined surfaces of the inclined grooves formed on the magnetic or non-magnetic substrate. Alternatively, it may be formed by the inclined surface of the inclined protrusion having the prescribed azimuth.

Figure 21:
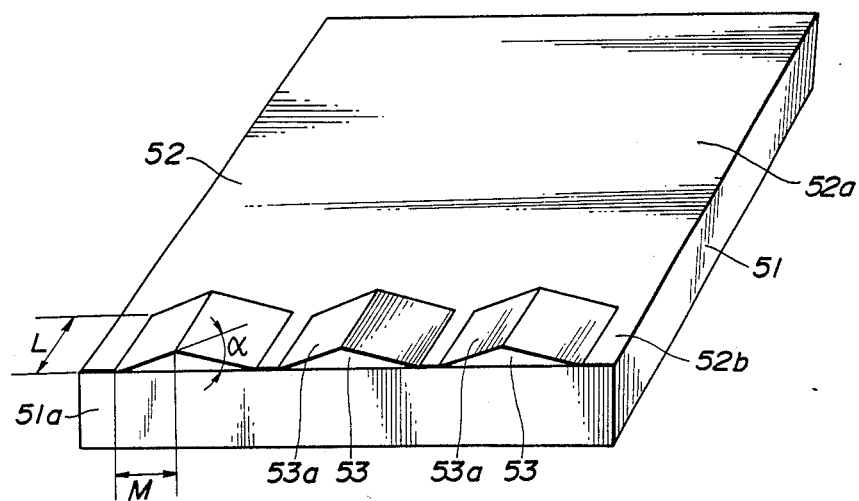
FIGS. 21 to 23 show another embodiment of the present invention.

In producing the thin film magnetic head of the present embodiment, as shown in FIG. 21, a plurality of inclined protrusions 53 are formed at a prescribed pitch at a portion 52b on the upper surface 52 of the flattened magnetic substrate 51 adjacent to the sliding contact surface with the magnetic recording medium and for the overall transverse extent of the substrate 51.

The protrusions 53 are formed with a magnetic material including a ferromagnetic oxide material such as Mn-Zn ferrite or Ni-Zn ferrite, or a magnetic metal material such as Fe-Al-Si alloy. At least one 53a of the twomated inclined surfaces of each inclined protrusion 53 corresponding to the sliding contact surface with the magnetic recording medium is inclined at a prescribed azimuth angle α relative to the upper surface 52. This inclined surface 53a corresponds to the magnetic gap forming surface.

The inclined surface 53a is set so that the width L thereof in the direction of the sliding contact surface with the magnetic recording medium is at least larger than the depth of the magnetic gap and the width M along the sliding contact surface is equal to or slightly larger than the prescribed track width.

The inclined protrusion 53 may be formed by (i) molding the protrusions with the substrate in a integrated manner by, for example, injection molding; or (ii) securing the protrusions to the substrate with an adhesive.

Figure 31A:
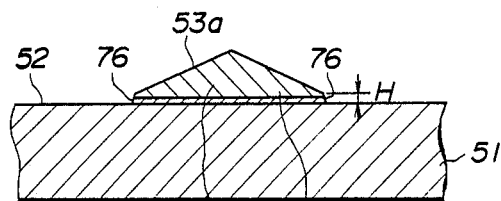
FIGS. 31A to 31D are partial sectional views showing one typical technique for eliminating height difference at the edges of a protrusion according to the actual sequence.
Figure 32A:
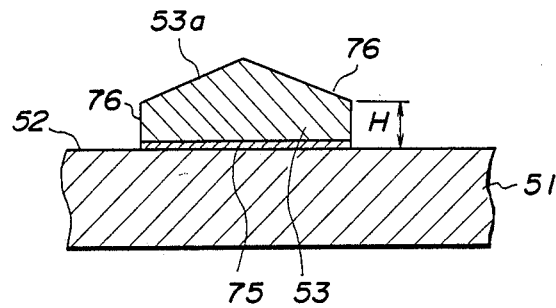
FIGS. 32A to 32C are partial sectional views showing another technique for eliminating height difference at the edges of a protrusion sequentially in this order.

It is noted that, when forming the inclined surface 53a by the method (ii) above, a step or height difference H tends to be formed at a transition or contact area 76 between the inclined surface 53a and the upper surface 52 due to chipping of the protrusion 53 or to the thickness of the adhesive 75 used for securing the protrusion 53 to the magnetic substrate 51, as shown in FIGS. 31A and 32A. It is essential that this step H be removed since it gives rise to deterioration in the azimuthal accuracy of the magnetic gap.

Figure 31B:
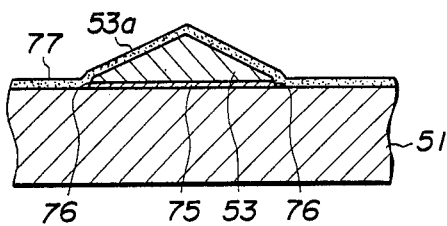
Figure 31C:
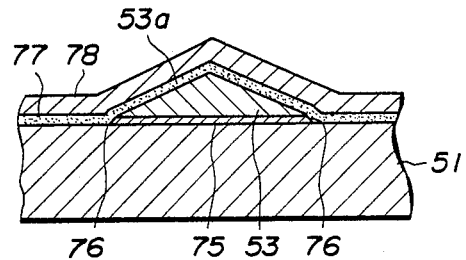
Figure 31D:
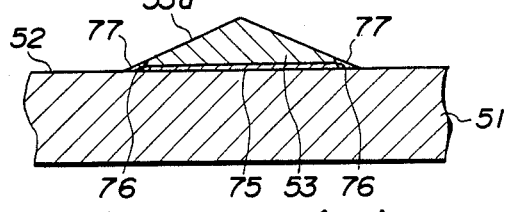

As a means for eliminating this height difference H, the following method may be resorted to in case the height difference H is extremely small as in FIG. 31A. Thus, as shown in FIG. 31B, an insulating layer 77 of, for example, SiO₂, is formed on the upper surface 52 of the magnetic substrate 51 inclusive of the protrusions 53 to a thickness at least not lesser than the step H. Then, as shown in FIG. 31C, an etching resist 78 is applied over the insulating film 77. This resist 78 is selected so that it has the selection ratio (the ratio of etching speed of etching resist 78 to the etching speed of insulating film 77) of 1:1 to the insulating film 77. Then, as shown in FIG. 31D, the insulating film 77 and the etching resist 78 are subjected to plasma etching for eliminating the height difference H by the remaining insulating film 77.

Figure 32B:
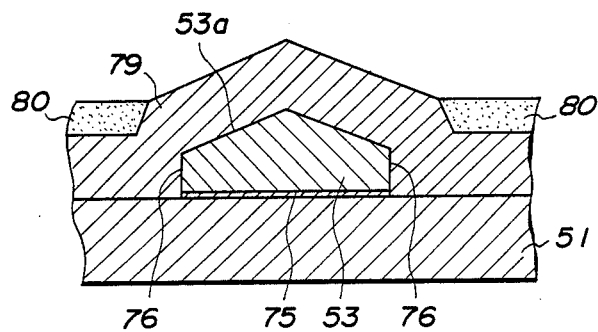
Figure 32C:
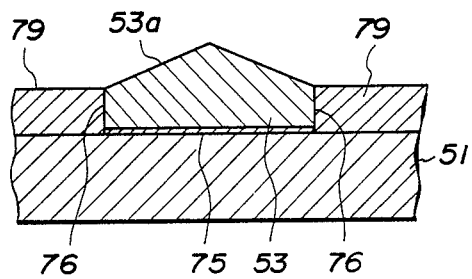

Alternatively, as shown in FIG. 32A, the following method may be used when the height difference H is so large that the difference H cannot be eliminated by the firstly stated method. Thus, as shown in FIG. 32B, a heat-resistant resist 79 is coated so as to be thicker at least than the aforementioned height difference H. Then an etching resist 80 is formed on other portions than the inclined protrusion 53. Then, as shown in FIG. 32C, the heat-resistant resist 79 on the inclined protrusion 53 is removed by etching and further the etching resist 80 is removed for eliminating the height difference H.

Figure 22:
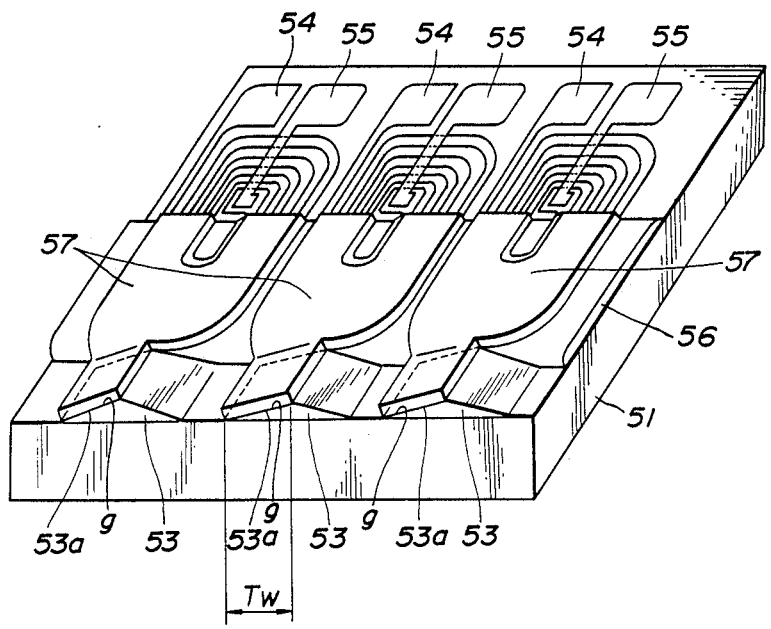

After the formation of the magnetic substrate 51 having the inclined protrusions 53 as described above, the coil conductor 53, the outgoing conductor 55, the resin layer 56 and the upper magnetic layer 57 are sequentially formed as shown in FIG. 22 with the intermediary of the insulating film similarly to the preceding embodiment.

In such manner, there obtained a magnetic circuit section having the track width Tw as set by the upper magnetic film 57 and an azimuth gap g as set by the inclined surface 53a of the inclined protrusion 53.

In this magnetic circuit section, the coil conductors 54 and the outgoing conductors 55 are formed on the flat portion 52a of the magnetic substrate 51 so that the high patterning accuracy of these conductors is assured. In addition, since the upper magnetic film 57 is formed on the substantially flat surface obtained by relieving the level difference caused by the coil conductors 54 and the outgoing conductors 55 by the resin layer 56, excellent magnetic properties are also obtained.

Figure 23:
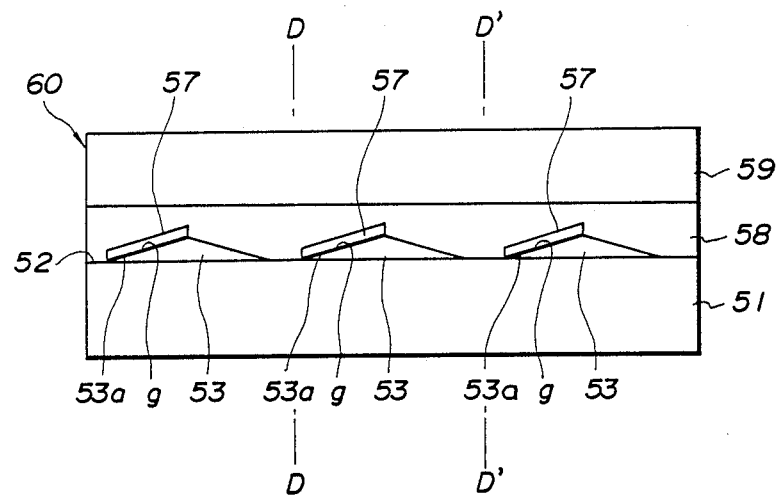

Then, as shown in FIG. 23, a non-magnetic material 58 such as glass is charged to cover the magnetic circuit section and a protective plate 59 is bonded to the non-magnetic material. In such manner, there obtained a head block having the in-line pattern of the azimuth gaps and having the azimuth of the magnetic gaps g defined by the inclined surface 53a of the inclined protrusion 53.

Figure 24:
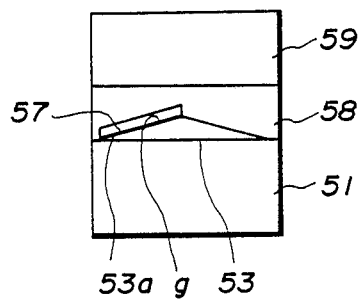
FIG. 24 is a plan view showing the thin film magnetic head obtained through the manufacturing processes shown in FIGS. 21 to 23.

The head block 60 is then sliced at the slicing position shown by the lines D—D and D'—D' in FIG. 23, that is, in a direction normal to the upper surface 52 of the magnetic substrate 51, to complete the thin film magnetic head having the sole azimuth gap g, as shown in FIG. 24.

At that time of slicing operation shown in FIG. 23, a larger slicing interval may be used so that a plurality of azimuth gaps g are formed in one head chip. In such manner, a multi-channel thin film magnetic head having an in-line pattern of plural azimuth gaps is obtained. FIG. 23 shows a three-channel thin film magnetic head as an example, however, the present invention is applicable to any other number of channels in one head chip.

Figure 25:
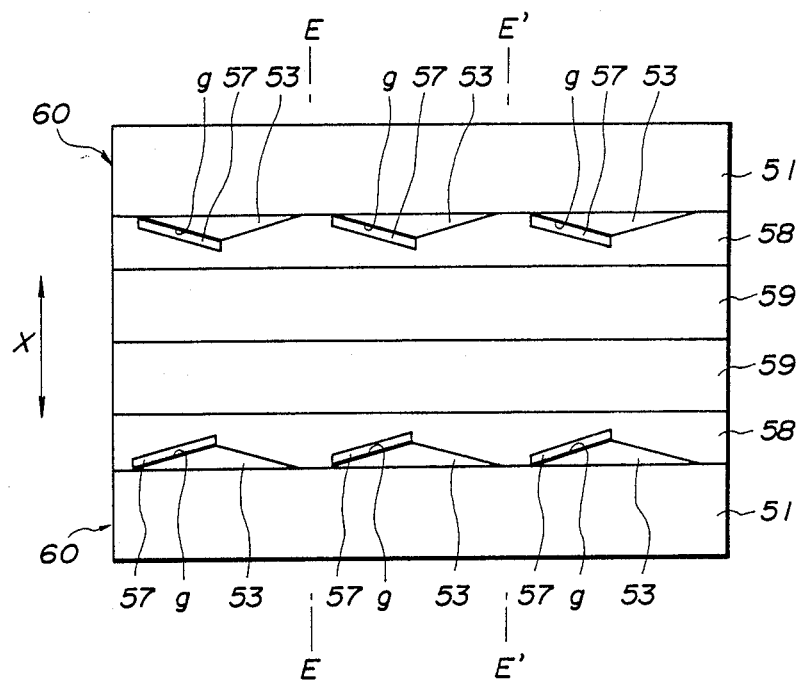
FIG. 25 is a plan view of pairs of head blocks, shown in FIG. 23, mutually bonded so that two series of azimuth gaps are opposed to each other as viewed from the running direction of magnetic according media.
Figure 26:
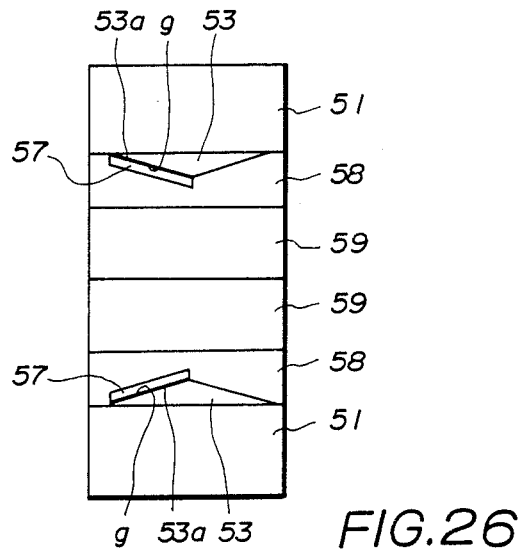
FIG. 26 is plan view showing a double-azimuth thin film magnetic head.

Alternatively, a pair of head blocks 60 obtained as described above are abutted and bonded to each other so that the azimuth gaps g are in the confronting and staggered relation as shown in FIG. 25. The head blocks 60 thus bonded together are then sliced at the sliding position shown by the lines E-E and E'—E' in FIG. 25 to produce the double azimuth thin film magnetic head shown in FIG. 26. In this case, the double azimuth multi-channel thin film magnetic head can be obtained using a larger slicing interval similarly to the preceding embodiment.

Figure 27:
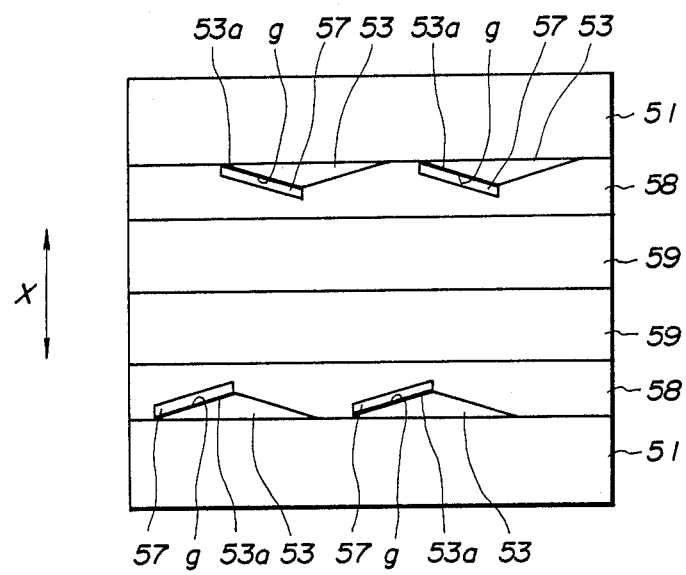
FIG. 27 is a plan view showing a four-channel thin film magnetic head obtained by slicing the head block shown in FIG. 25.

In addition, in the course of bonding the head blocks 60 shown in FIG. 25 to each other, the head blocks can be abutted and united so that the confronting azimuth gaps g are slightly overlapped to each other when seen from the running direction X of the magnetic recording medium before being sliced at the prescribed slicing position. In such manner, the multi-channel thin film magnetic head, four-channel head in the present embodiment, which is suitable for digital VTRs can be obtained as shown in FIG. 27.

In the case of the aforementioned thin film magnetic heads having the azimuth gaps disposed in the facing relation to each other, the shield layer can be disposed between the opposing gaps g to reduce the crosstalk caused by the reduction in the gap interval.

In the foregoing, the various types of the thin film magnetic heads have been described in which the magnetic substrates formed with the magnetic oxide materials such as Mn-Zn ferrite are used as the substrate. However, for these ferromagnetic substrate can be substituted composite substrates composed of the aforementioned ferromagnetic metal material that is laminated on the non-magnetic substrates such as ceramic substrates, or composite substrates composed of the ferromagnetic metal material that is laminated on the ferromagnetic oxide substrates.

Figure 28:
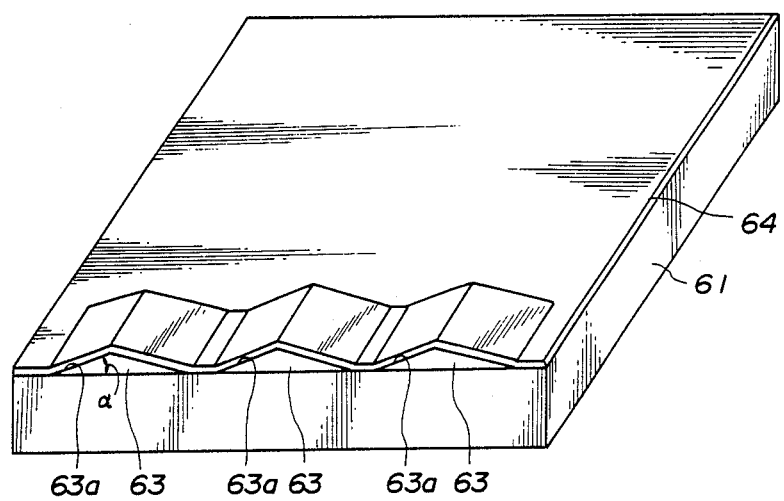
FIGS. 28 and 29 show another embodiment of the present invention.

Thus, as shown in FIG. 28, a plurality of inclined protrusions 63 may be provided on the non-magnetic substrate or magnetic oxide substrate 61 in the same manner as described in the preceding example to form the surfaces 63a inclined at a prescribed angle α. Then, the lower magnetic film 64 formed of the aforementioned magnetic metal material can be deposited on the overall surface of the substrate 61 having the inclined surface 63a to produce the composite substrate.

Figure 29:
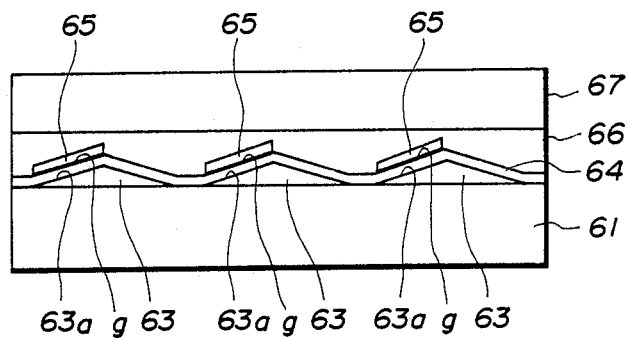

Then, as shown in FIG. 29, the coil conductors and the upper magnetic film 65 are laminated on the lower magnetic film 64 via the medium of an insulating film and the protective film 67 is then applied to the conductors and the film 65. In such manner, the head block is completed in which the azimuth gap g is formed by the upper magnetic film 65 and the lower magnetic film 64 on the inclined surface 63a.

Figure 30:
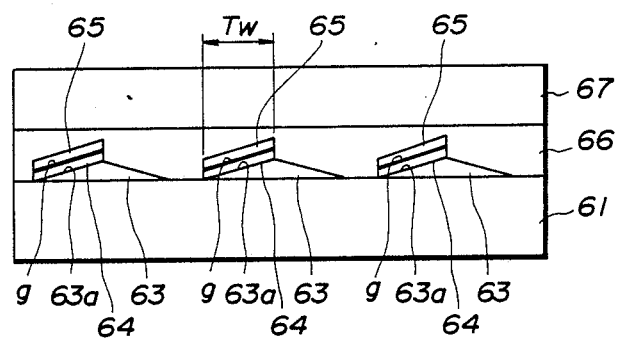
FIG. 30, which relates to another embodiment of the present invention, is a plan view showing a thin film magnetic head in which pairs of lower and upper films are discretely formed.

There may also be employed a composite substrate in which the track width Tw is controlled by patterning the lower magnetic film 64 after the deposition of the lower magnetic film 64. In this case! The produced thin film magnetic head has the azimuth gaps g separated channel-wise on the sliding contact surface with the magnetic recording medium, as shown in FIG. 30, so that the cross-talk from the adjacent and next adjacent tracks is removed resulting in improved recording and reproducing characteristics.

In case of using the aforementioned composite substrates, the inclined protrusions may be formed of a nonmagnetic material instead of a magnetic material.

In the above embodiments, the inclined grooves or protrusion defining the azimuth of the magnetic gap are formed in the vicinity of the sliding contact surface with the magnetic recording medium. However, the present invention is not limited to this specific arrangement. For example, when producing the thin film magnetic head having the sole azimuth gap, the inclined grooves or protrusions may be continuously formed on the overall extent of the substrate, such as a wafer, and obliquely with respect to the track width direction.

Figure 33:
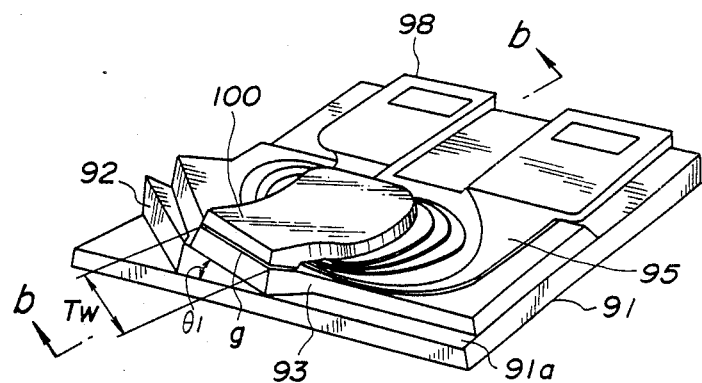
FIGS. 33 to 35 show another embodiment of the present invention.
Figure 34:
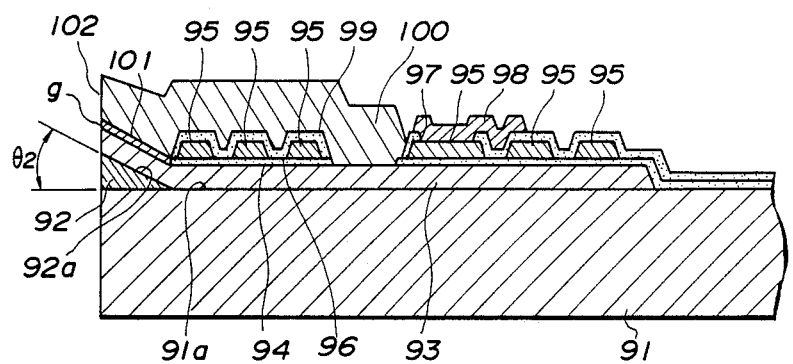
Figure 35:
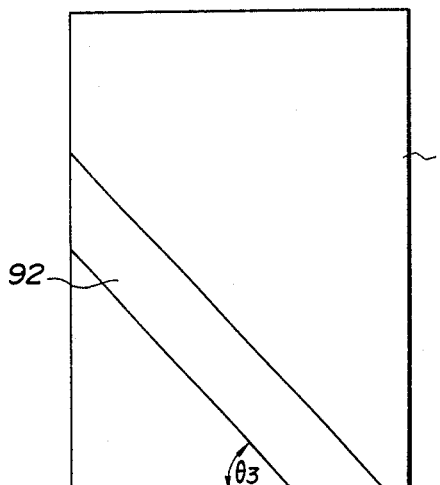

In the embodiment of the thin film magnetic head shown in FIGS. 33 and 34, on one surface 91a of the substrate 91 formed with the non-magnetic material such as ceramics, there is formed an inclined protrusion 92 having an inclined surface 92a having a preset angle $\theta_2$ with respect to the surface 91a. Although the inclined protrusion 92 may be formed on the overall surface 91a, the protrusion 92 in the present embodiment is wedge-shaped or vee-shaped in crosssection and formed obliquely to the sliding contact surface 102 with the magnetic recording medium in the vicinity of the magnetic gap g.

By providing the protrusion 92 only in the vicinity of the magnetic gap g the the coil conductors 95 to be described later are formed only on the flat surface 91, so that the patterning accuracy is assured.

On the substrate 91 including the protrusion 92, there is deposited the lower magnetic film 93 formed with the ferromagnetic metal material such as Fe-Al-Si alloy or amorphous alloy. In the lower magnetic film 93, there formed a spiral coil conductor 95 through an insulating film 94 and an outgoing conductor 98 that is electrically connected through a contact window 97 in an insulating film 96 formed on the coil conductor 95. The upper magnetic film 100 formed with the magnetic metal material is laminated via an insulating film 99.

The magnetic gap g is formed by the upper magnetic film 100 and the lower magnetic film 93 on the inclined protrusion 92. It is noted that the lower magnetic film 93 and the upper magnetic film 100 are formed by patterning to a prescribed track width Tw in the vicinity of the operating gap. When seen from the sliding contact surface with the magnetic recording medium, the lower magnetic film 93 and the upper magnetic film 100 are physically separated from the adjacent films.

In addition, a protective plate, not shown, is melt-bonded on the upper magnetic film 100 with glass or the similar bonding agent for protecting the electromagnetic converting section mainly consisting of the lower magnetic film 93, the coil conductor 95, and the upper magnetic film 100 while also assuring a sliding contact with the magnetic recording medium.

In producing the above described thin film magnetic head, a wedge-shaped inclined block 92 is melt-adhered on one planar surface 91a of the substrate 91 with a prescribed angle $\theta_3$ relative to a surface 102a corresponding to the sliding contact surface with the magnetic recording medium. It is noted that the step or height difference in the vicinity of the junction with the inclined protrusion 92 should be removed by the method referring to FIGS. 31A to D or FIGS. 32A to 32C. Then, the lower magnetic film 93, the coil conductors 95 and the upper magnetic film 100 are sequentially laminated similarly to the preceding embodiment. The resulting head block is sliced at the prescribed position to complete the thin-film magnetic head shown in FIGS. 33 and 34.

In the present thin film magnetic head, the azimuth angle $\theta_1$ of the magnetic gap g is determined by an angle $\theta_2$ between the inclined surface 92a of the protrusion 92 formed on the substrate 91 and one surface 91a on the substrate 91 acting as the reference surface, and by an angle $\theta_3$ between the wedge-shaped inclined protrusion 92 and the surface 102a corresponding to the sliding contact surface of the magnetic recording medium.

Therefore, the azimuth gap g inclined at a prescribed angle $\theta_1$ relative to the upper surface 91a of the substrate 91 is formed by slicing normal to the substrate 91 so that the produced thin film magnetic head is excellent in azimuthal accuracy.

In addition, by using artifices in the provision of the inclined protrusions, a thin film magnetic head superior in azimuthal accuracy may be produced efficiently.

Figure 36A:
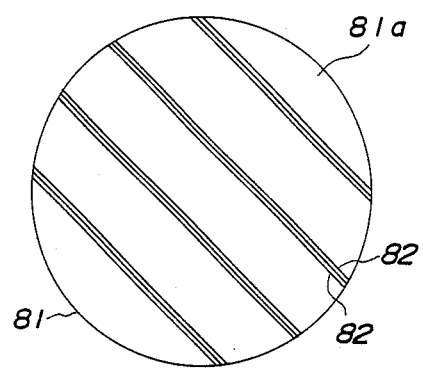
FIG. 36A is a plan view of an inclined surface.

Thus, as shown in FIG. 36A, a plurality of inclined surfaces 82 with a prescribed angle $\beta$ relative to the upper surface 81a are formed on the upper surface 81a of the substrate 81 acting as the reference surface in parallel with each other. These inclined surfaces 82 are formed in the opposing relation to each other. It is the angle of inclination of the inclined surfaces 82 that determines the azimuth angle of the magnetic gap.

The inclined surfaces 82 are arranged obliquely to the direction of the track width of the magnetic gap and in parallel to each other for the overall extent of the substrate 81. The angle of the inclined surfaces 82 to the direction of the track width is set so that a majority of the magnetic circuit is formed. The angle is set therein to 45°.

Figure 36B:
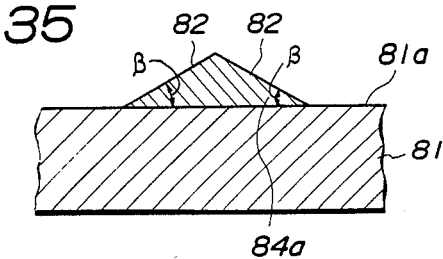
FIG. 36B is a partial sectional view of a substrate when an inclined surface is formed over the protrusion.
Figure 36C:
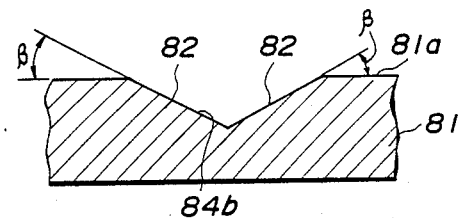
FIG. 36C is a partial sectional view of a substrate when an inclined surface is formed inside the inclined groove.

To form the inclined surfaces 82 the method for forming the inclined protrusion 84a on the upper surface 81a of the substrate 81 as shown in FIG. 36B, or method for machining an inclined groove 84b by grinding or ion etching, as shown in FIG. 36C, may be used. It will be noted that, in forming the inclined surfaces 82 by the inclined protrusion 84a, the height difference in the vicinity of the junction surface should be previously removed by artifice shown in FIGS. 31A to 31D or by artifice shown in FIG. 32A to 32C.

Figure 37:
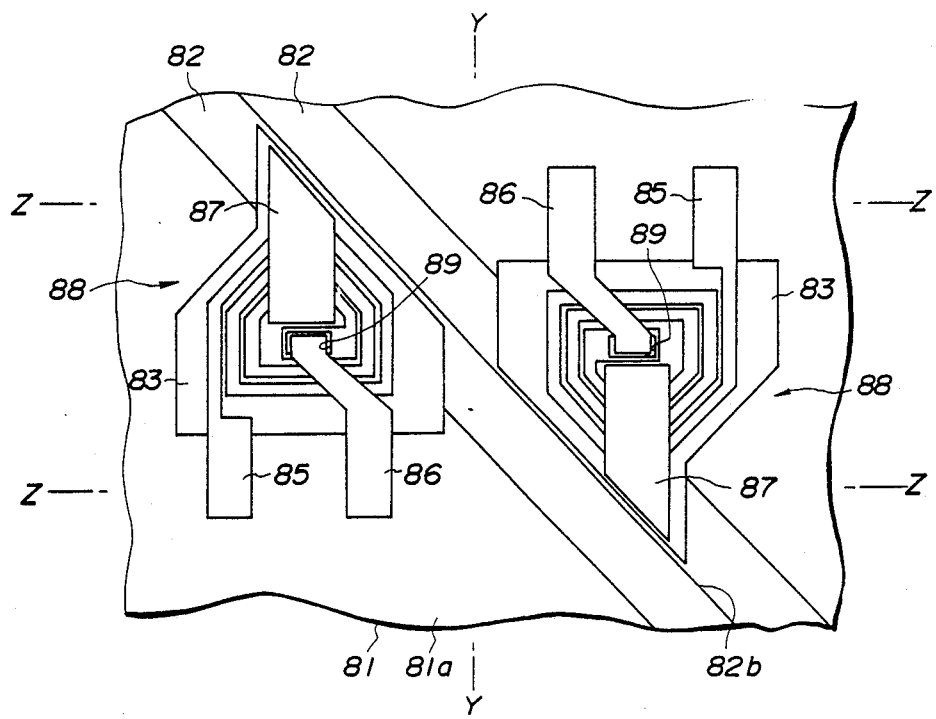

Then, as shown in FIG. 37, the lower magnetic film 83, the coil conductor 85, the outgoing conductor 86 and the upper magnetic film 87 are sequentially formed on the substrate 81 inclusive of the inclined surfaces 82 via the intermediary of insulating films, not shown, to form a magnetic circuit 88. It will be noted that the magnetic circuit 88 is alternately formed in a staggered relation on both sides of the inclined surfaces 82. By alternately forming the magnetic circuits 88 in this manner, as many magnetic circuits 88 as possible can be obtained from a single substate 81, so that an advantage in mass productivity is obtained.

It will be noted that the coil conductor 85 and the outgoing conductor 86 are connected to each other by a contact window 89 formed in the insulating film between these layers.

Since the majority of the coil conductor 85 and the outgoing conductor 86 is formed on the flat portion of the substrate 81, there is no risk that patterning accuracy is deteriorated.

Figures 38A, 38B:
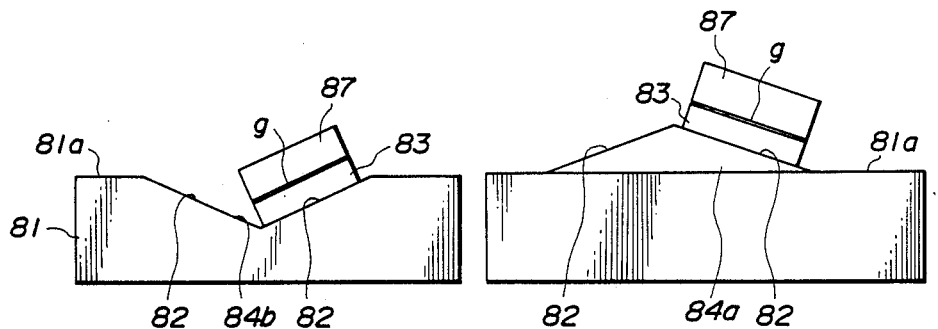
FIG. 38A is a plan view of a thin film magnetic head manufactured when the substrate shown in FIG. 36B is employed.
FIG. 38B is a plan view of a thin film magnetic head obtained when the substrate shown in FIG. 36C is used.

The head block thus obtained is sliced at the slicing position indicated by the line Y—Y and Z—Z in FIG. 37, that is, at the slicing position normal to the upper surface 81a of the substrate 81 and inclined relative to the inclined surface 82b, to complete the thin film magnetic head shown in FIG. 38A. It is however noted that the protective plate is united with the head block via the non-magnetic material so as to overlay the magnetic circuit 88 to protect the magnetic circuit 88 and to assure the sliding contact with the magnetic recording medium.

In the thus obtained thin film magnetic head having the azimuth gap g, the inclined surface 82 with a prescribed azimuth relative to the upper surface 82 of the substrate 81 is formed by the inclined protrusion 84a or the inclined groove 84b, while the azimuth gap g is formed by the upper magnetic film 87 and the lower magnetic film 83 formed on the inclined surface 82.

In addition, this thin film magnetic head is also superior in mass productivity since the inclined protrusion 84a or the inclined groove 84b is continuously formed on the overall substrate 81 sc that the azimuth of plural heads is defined by the sole inclined protrusion 84a or the inclined groove 84b.

Also the thin film magnetic head having superior azimuthal accuracy is obtained since the slicing is performed normal to the upper surface 81a.

We claim as our invention:

1. A thin film magnetic head including a magnetic substrate having a generally planar upper surface, a coil conductor and an upper magnetic film that are successively laminated on said upper generally planar surface of said magnetic substrate with the interposition of respective insulating films above and below said coil conductor, and at least one inclined surface formed on said substrate in the vicinity of a slide contact surface thereof with a magnetic recording medium, said inclined surface being inclined at a predetermined angle relative to said upper surface, said upper magnetic film being formed on said inclined surface for setting the azimuth of a magnetic gap formed between said substrate and said upper magnetic film.

2. The structure set forth in claim 1 wherein said inclined surface comprises an inclined groove in said substrate.

3. The structure of claim 1 wherein said inclined surface comprises an inclined protrusion formed on said substrate.

4. A thin film magnetic head inclining a magnetic substrate having a generally planar upper surface, a lower magnetic film, a coil conductor, and an upper magnetic film that are successively laminated on said upper generally planar surface of said magnetic substrate with the interposition of respective insulating films above and below said coil conductor, and at least one inclined surface formed on said substrate in the vicinity of a sliding contact surface thereof with a magnetic recording medium, said surface being inclined at a predetermined angle relative to said upper surface, said lower and upper magnetic films being formed on said inclined surfaces to set the azimuth of a magnetic gap formed between said upper and lower magnetic films.

5. The structure of claim 4 wherein said inclined surface comprises an inclined groove in said upper surface.

6. The structure of claim 4 wherein said inclined surface comprises an inclined protrusion on said upper surface.

7. A thin film magnetic head according to any one of claims 1, 2, 3, 4, 5 and 6 having one such gap.

8. A thin film magnetic head according to any one of claims 1, 2, 3, 4, 5 and 6 wherein plural magnetic gaps are formed in along a line which is normal to the travelling direction of the magnetic recording medium.

9. A thin film magnetic head according to any one of claims 1, 2, 3, 4, 5 and 6 including two such magnetic gaps that are arranged in staggered relation along the travelling direction of the magnetic recording medium.

10. A thin film magnetic head according to claim 9 wherein a shield layer is interposed between the confronting magnetic gaps.

11. A thin film magnetic head according to any one of claims 1, 2, 3, 4, 5 and 6 including a plurality of such magnetic gaps that are arranged in two rows in a direction normal to the travelling direction of the magnetic recording medium, with the confronting ones of the magnetic gaps scanning the same track.

12. A thin film magnetic head according to claim 11 wherein a shield layer is interposed between the confronting magnetic gaps.

13. A thin film magnetic head according to any one of the claims 1, 2, 3, 4, 5 and 6 including a plurality of such magnetic gaps that are arranged in two rows in a direction normal to the travelling direction of the magnetic recording medium, with the confronting ones of the magnetic gaps scanning the neighboring recording tracks.

14. A thin film magnetic head according to claim 13 wherein a shield layer is interposed between the confronting magnetic gaps.

15. A thin film magnetic head according to claims 3 or 6 wherein the inclined protrusions are formed with a magnetic material.

16. A thin film magnetic head according to claim 6 wherein said inclined protrusions are formed with a non-magnetic material.

17. A thin film magnetic head according to any one of claims 1, 2, 3, 4, 5 and 6 wherein the thin film coil conductor is formed on the flat portion of the magnetic substrate.

* * * * *